(12) United States Patent
Connors et al.

(10) Patent No.: US 12,300,839 B2
(45) Date of Patent: May 13, 2025

(54) BATTERY PACK WITH HOUSING FOR ELECTRIC POWERSPORT VEHICLES

(71) Applicant: Taiga Motors Inc., Lasalle (CA)

(72) Inventors: Shawn Connors, Bois-des-Filion (CA); François Gagné, Sherbrooke (CA); Paul Achard, Montreal (CA); Samuel Bruneau, Montreal (CA); Gabriel Bernatchez, Montreal (CA); Marc-Olivier Gagnon, Montreal (CA); Paul Bruneau, Montreal (CA); Dante Filice, Montreal (CA)

(73) Assignee: Taiga Motors Inc., Lasalle (CA)

( * ) Notice: Subject to any disclaimer, the term of this patent is extended or adjusted under 35 U.S.C. 154(b) by 316 days.

(21) Appl. No.: 17/888,011

(22) Filed: Aug. 15, 2022

(65) Prior Publication Data

US 2023/0081226 A1    Mar. 16, 2023

Related U.S. Application Data

(60) Provisional application No. 63/242,695, filed on Sep. 10, 2021.

(51) Int. Cl.
*H01M 50/249* (2021.01)
*B60K 1/04* (2019.01)
(Continued)

(52) U.S. Cl.
CPC .............. *H01M 50/249* (2021.01); *B60K 1/04* (2013.01); *B60L 50/64* (2019.02); *H01M 50/244* (2021.01); *B60K 2001/0405* (2013.01)

(58) Field of Classification Search
CPC .... H01M 50/249; H01M 50/244; B60K 1/04; B60K 2001/0405; B60L 50/64; B60L 50/60
See application file for complete search history.

(56) References Cited

U.S. PATENT DOCUMENTS 9,016,080 B2   4/2015   Brodie et al.
9,533,544 B2   1/2017   Johnston
(Continued)

FOREIGN PATENT DOCUMENTS

WO    2021/084520    5/2021

OTHER PUBLICATIONS

Per Trostemo, "The First Electric Snowmobile", Green Solutions from Sweden, pp. 100-101, Nov. 18, 2015.
(Continued)

*Primary Examiner* — Erez Gurari
(74) *Attorney, Agent, or Firm* — Dicke, Billig & Czaja, PLLC

(57) ABSTRACT

One example provides a chassis for an electric snowmobile including a battery pack. The battery pack includes a battery pack housing defining an enclosure for housing a number of battery modules for powering an electric motor of the electric snowmobile, the battery pack housing having a length extending in a longitudinal direction of the snowmobile, the battery pack housing including a bottom surface. A pair of opposing side panels extends downwardly from and along at least a portion of the length of the battery pack housing, the opposing panels and at least portions of the bottom surface of the battery pack housing together forming a rear structure extending in the longitudinal direction of the electric snowmobile.

20 Claims, 10 Drawing Sheets

(51) Int. Cl.
*B60L 50/64* (2019.01)
*H01M 50/244* (2021.01)

(56) References Cited

U.S. PATENT DOCUMENTS

| 11,731,734 | B2* | 8/2023 | Matsushita | B60L 50/60 |
|---|---|---|---|---|
| | | | | 180/190 |
| 2010/0025006 | A1 | 2/2010 | Zhou | |
| 2020/0140037 | A1 | 5/2020 | Haavikko et al. | |
| 2020/0239107 | A1* | 7/2020 | Viebke | B62M 27/02 |
| 2021/0188182 | A1* | 6/2021 | Edwards | B62D 57/024 |
| 2021/0188185 | A1* | 6/2021 | Hedlund | B60R 9/12 |
| 2022/0009589 | A1 | 1/2022 | Matsushita | |
| 2022/0017181 | A1* | 1/2022 | Suzuki | B60L 50/66 |
| 2022/0063764 | A1 | 3/2022 | Matsushita | |
| 2022/0111929 | A1 | 4/2022 | Matsushita | |
| 2022/0219782 | A1* | 7/2022 | Bruneau | H01M 50/249 |
| 2022/0411018 | A1* | 12/2022 | Vaisanen | B60L 15/2009 |
| 2023/0081226 | A1* | 3/2023 | Connors | B60K 1/04 |
| | | | | 180/68.5 |
| 2023/0191922 | A1* | 6/2023 | Bernatchez | B60L 50/60 |
| | | | | 180/182 |
| 2024/0017794 | A1* | 1/2024 | Martel | B62J 43/20 |
| 2024/0067303 | A1* | 2/2024 | Schroeder | H02K 1/2766 |
| 2024/0123867 | A1* | 4/2024 | Al-Zareer | B60K 11/02 |
| 2024/0149977 | A1* | 5/2024 | Schroeder | B62M 27/02 |
| 2024/0190276 | A1* | 6/2024 | Absar | B60L 50/60 |

OTHER PUBLICATIONS https://www.youtube.com/watch?v=r18TY5DQk_4, published Apr. 23, 2010.

Mathew Brown, et al., "Review of Zero-Emission Utah State Snowmobile", Utah State University Electric Snowmobile Team, 13 pgs., Mar. 2007.

Marcia Goodrich, "Clean Snowmobile Challenge on Track for March", Published Jan. 24, 2012, https://www.mtu.edu/news/stories/2012/january/clean-snowmobile-challenge-track-for-march.html.

Snowbird: "Austrian Electric Snowmobile Reaches 120kph", Technologi Vehicles, Mar. 3, 2013. https://technologicvehicles.com/en/green-transportation-news/2340/snowbird-cette-motoneige-electrique-autrichie#. YEklETZYYdU.

"Snowbird", FH-Joanneum University of Applied Sciences, Nov. 2011-Feb. 2013, https://www.fh-joanneum.at/en/projekt/snowbird/.

https://www.youtube.com/watch?v=mLlaLhXoFUs, Snowmobile Spritztour, Published Jan. 25, 2015.

https://www.motoneigeauquebec.com/forum/content.php?518-Motoneige-%E9lectrique-version-Su%E9doise-et-sportive, published Dec. 3, 2013.

https://sverigesradio.se/sida/artikel.aspx?programid=109&artikel=5033462, Soruman, Mar. 24, 2012.

https://www.svt.se/nyheter/lokalt/vasterbotten/el-skotern-ska-satta-storuman-pa-kartan, Jan. 20, 2015.

http://advantage-environment.com/transport/introducing-the-electric-snowmobile/ (accessed via https://web.archive.org/ to obtain properly displayed images), Mar. 2011.

https://newatlas.com/clean-snowmobile-challenge-2011/18121/, Mar. 17, 2011.

www.icatpro.com/electric-snowmobile-icatpro-zero-emission-technology/, Nov. 30, 2017.

https://www.vice.com/en/article/9397m8/the-first-electric-snowmobile-in-the-market-is-a-remarkably-quiet-ride, Apr. 16, 2020.

https://www.youtube.com/watch?v=Z-TbgZvYBpM&ab_channel=dubedubz, Dec. 6, 2016.

https://www.youtube.com/watch?v=ZAYICbZAFpQ&ab_channel=TaigaMotors, Apr. 15, 2020.

* cited by examiner

BATTERY PACK WITH HOUSING FOR ELECTRIC POWERSPORT VEHICLES

CROSS-REFERENCE TO RELATED APPLICATIONS

This application claims priority from U.S. Provisional Patent Application No. 63/242,695, filed Sep. 10, 2021, which is incorporated by reference in its entirety herein.

FIELD OF THE INVENTION

This disclosure relates generally to electric powersport vehicles.

BACKGROUND

Electric powersport vehicles, including electric snowmobiles, employ electric powertrains which typically include a battery system, one or more electric motors, and various auxiliary systems (e.g., heating/cooling systems). Efficiencies in size and weight along with increased component durability and modularity may help improve vehicle performance (e.g., reliability, functionality, range, acceleration, endurance) as well as manufacturing and operational costs.

SUMMARY

One example provides a chassis for an electric snowmobile. The chassis includes a battery pack including a battery pack housing defining an enclosure for housing a number of battery modules for powering an electric motor of the electric snowmobile, the battery pack housing having a length extending in a lengthwise or longitudinal direction of the snowmobile, the battery pack housing including a bottom surface. A pair of opposing side panels extends downwardly from and along at least a portion of the length of the battery pack housing, the opposing panels and at least portions of the bottom surface of the battery pack housing together forming a tunnel extending in the longitudinal direction of the electric snowmobile.

Another example provides a battery pack for an electric vehicle. The battery pack includes a number of battery modules to power an electric motor driving the electric vehicle, and a battery pack housing. The battery pack housing defines an enclosure housing at least the number of battery modules, the housing including an integral heat exchanger, the heat exchanger forming a portion of an exterior surface of the battery pack housing, the heat exchanger to cool a heat transfer fluid used to cool at least the number of battery modules, and the electric motor and a corresponding DC-AC inverter.

Another example provides an electric vehicle including an electric motor and a battery pack. The battery pack includes a battery pack housing defining a sealed enclosure housing at least a number of battery modules to power the electric motor, the sealed enclosure defining an interior volume of air to provide buoyancy to the electric vehicle.

Another example provides a chassis for an electric snowmobile. The chassis comprises a battery pack including a battery pack housing defining an enclosure for housing a number of battery modules for powering an electric motor of the electric snowmobile, the battery pack housing having a length extending in a longitudinal direction of the snowmobile, the battery pack housing including a bottom surface. The chassis also comprises a pair of opposing side panels extending downwardly from and along at least a portion of the length of the battery pack housing, the opposing panels and at least portions of the bottom surface of the battery pack housing together forming a rear structure extending in the longitudinal direction of the electric snowmobile, the opposing side panels forming sidewalls of the rear structure and the bottom surface forming at least a roof of the rear structure.

In some embodiments, the bottom surface forms a front wall of the rear structure.

In some embodiments, the pair of opposing side panels are attached to the battery pack housing.

In some embodiments, the pair of opposing side panels are integrally formed with the battery pack housing.

In some embodiments, the opposing side panels are to couple to a rear suspension assembly including a drive track of the snowmobile such that the rear structure is disposed over at least a portion of the drive track.

In some embodiments, the battery pack housing has a forward portion and a rearward portion, the chassis including a front structure coupled to the forward portion of the battery enclosure.

In some embodiments, the front structure is to couple to a front suspension assembly of the snowmobile, the front suspension assembly including a pair of skis.

In some embodiments, the battery pack housing includes a bottom panel having an exterior surface defining the bottom surface of the battery pack housing, wherein the bottom panel includes a heat exchanger for cooling a heat transfer fluid used to cool at least the number of battery modules.

In some embodiments, the enclosure houses the electric motor and a corresponding inverter, and a pump for circulating the heat transfer fluid.

In some embodiments, enclosure is sealed in a water tight fashion.

In some embodiments, the sealed enclosure defines an enclosed air volume to provide buoyancy to the snowmobile to keep the snowmobile afloat.

Another example provides an electric snowmobile comprising an electric motor and a chassis. The chassis includes a battery pack having a battery pack housing defining an enclosure for housing a number of battery modules for powering the electric motor, the battery pack housing having a length extending in a longitudinal direction of the snowmobile, the battery pack housing including a bottom surface. The chassis also includes a pair of opposing side panels extending downwardly from and along at least a portion of the length of the battery pack housing, the opposing side panels and at least portions of the bottom surface of the battery pack housing together forming a rear structure extending in the longitudinal direction of the electric snowmobile, the opposing side panels forming sidewalls of the rear structure and the bottom surface forming at least a roof of the rear structure.

In some embodiments, the bottom surface forms a front wall of the rear structure.

In some embodiments, the pair of opposing side panels are attached to the battery pack housing.

In some embodiments, the pair of opposing side panels are integrally formed with the battery pack housing.

In some embodiments, the opposing side panels are to couple to a rear suspension assembly including a drive track of the snowmobile such that the rear structure is disposed over at least a portion of the drive track.

In some embodiments, the battery pack housing has a forward portion and a rearward portion, the chassis including a front structure coupled to the forward portion of the battery enclosure.

In some embodiments, the front structure is to couple to a front suspension assembly of the snowmobile, including a pair of skis.

In some embodiments, the battery pack housing includes a bottom panel having an exterior surface defining the bottom surface of the battery pack housing, wherein the bottom panel includes a heat exchanger for cooling a heat transfer fluid used to cool at least the number of battery modules, and the electric motor and a corresponding inverter to provide power to the electric motor.

In some embodiments, the enclosure houses the electric motor and corresponding inverter, and a pump for circulating the heat transfer fluid.

In some embodiments, the enclosure is sealed.

In some embodiments, the sealed enclosure defines an enclosed air volume to provide buoyancy to the snowmobile.

Another example provides a battery pack for an electric vehicle comprising a number of battery modules to power to an electric motor driving the electric vehicle, and a battery pack housing defining an enclosure housing at least the number of battery modules, the housing including an integral heat exchanger, the heat exchanger forming a portion of an exterior surface of the battery pack housing, the heat exchanger to cool a heat transfer fluid used to cool at least the number of battery modules along with the electric motor and a corresponding inverter.

In some embodiments, the enclosure houses the electric motor and corresponding inverter, and a pump for circulating the heat transfer fluid.

In some embodiments, the enclosure houses at least one of a charger for charging the number of battery modules, a low voltage battery, a DC-DC converter to charge the low voltage battery from the number of battery pack modules, a charging port for receiving an external power source, and controllable contactors to selectively connect the number of battery modules to the inverter.

In some embodiments, the battery pack housing is sealed to provide a sealed enclosure.

In some embodiments, the sealed enclosure defines a volume of air to provide buoyancy to the electric vehicle.

Another example provides a battery pack for an electric vehicle comprising a number of battery modules to power to an electric motor driving the electric vehicle, and a battery pack housing defining a sealed enclosure housing at least the number of battery modules, the sealed enclosure defining an interior volume of air to provide buoyancy to the electric vehicle.

In some embodiments, the battery pack further includes the electric motor and a corresponding inverter disposed within the sealed enclosure.

Another example provides an electric snowmobile comprising an electric motor; a battery pack having a battery pack housing defining an enclosure for housing a number of battery modules for powering the electric motor, the battery pack housing having a length extending in a longitudinal direction of the electric snowmobile; a pair of opposing side panels coupled to the battery pack housing and extending downwardly from and along at least a portion of the length of the battery pack housing; and a rear suspension assembly, including an endless track, coupled to the pair of opposing side panels.

In some embodiments, the opposing side panels and at least portions of a bottom surface of the battery pack housing together form a rear structure extending in the longitudinal direction of the electric snowmobile, the opposing side panels forming sidewalls of the rear structure and the bottom surface forming at least a roof of the rear structure.

Another example provides a battery pack for an electric vehicle comprising a number of battery modules to power to an electric motor driving the electric vehicle, and a battery pack housing defining an enclosure housing at least the number of battery modules, the electric motor, and an inverter to convert DC power from the number of battery modules to AC power to power the electric motor.

Another example provides an electric vehicle comprising an electric motor, and a battery pack including a battery pack housing defining a sealed enclosure housing at least a number of battery modules to power the electric motor, the sealed enclosure defining an interior volume of air sufficient to provide buoyancy to the electric vehicle.

In some embodiments, the electric motor is disposed within the sealed enclosure.

In some embodiments, the electric vehicle further includes at least one air bag and a submersion sensor, upon being submerged in water the submersion sensor to trigger deployment of the at least one air bag, a volume of gas within the air bag to provide buoyancy to the electric vehicle.

In some embodiments, the electric vehicle further includes a beacon to provide an audible and/or visual beacon, where upon being submerged in water the submersion sensor triggers the beacon to emit a high visibility light beacon and/or an audible beacon.

In some embodiments, the electric vehicle comprises an electric snowmobile.

Another example provides an electric vehicle comprising a housing defining a sealed enclosure housing an electric powertrain. The electric powertrain includes an electric motor having a corresponding electrical inverter, a number of rechargeable battery modules to power the electric motor via the electrical inverter, and a thermal management system.

In some embodiments, a bottom surface of the housing incorporates a heat exchanger of the thermal management system.

In some embodiments, the sealed enclosure comprises a water tight enclosure defining an interior air volume sufficient to provide buoyancy to the electric vehicle.

Additional and/or alternative features and aspects of examples of the present technology will become apparent from the following description, the accompanying drawings, and the appended claims.

DETAILED DESCRIPTION

Figure 1A:
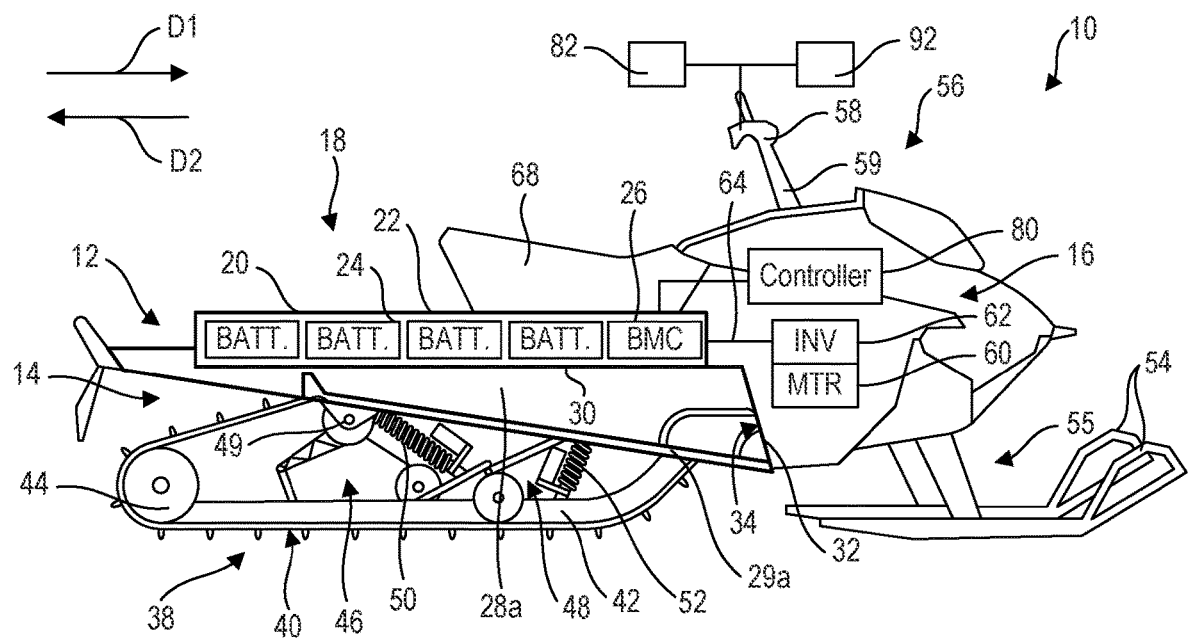
FIG. 1A generally illustrates an electric snowmobile including a battery pack forming at least a portion of a tunnel structure, in accordance with one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

The basic platform for a snowmobile is a chassis (also referred to as a frame), wherein the chassis typically includes a tunnel forming a rearward portion of the chassis, and a front frame attached to and disposed forward of the tunnel (where forward and rearward are relative to the typical direction of travel of the snowmobile). A front suspension assembly supporting a pair of front skis is attached to the front frame along with a steering assembly for steering the skis. The front frame typically includes a structure (sometimes referred to as a mid-bay or cradle) for supporting an internal combustion engine (in the case of a gas-powered snowmobile) or an electric motor (in the case of an electrically-powered snowmobile).

Conventionally, the tunnel is a generally inverted U-shaped metallic structure having an upper panel and a pair of downwardly projecting opposing side panels. Such conventional U-shaped tunnels are generally achieved by bending, rolling, and/or stamping sheet metal or otherwise forming the metal panels into the U-shaped structure. Conventional metallic tunnels may be formed from a single piece of sheet metal that forms a monolithic U-shaped structure, or may be formed from two or more pieces of metal that are mechanically fastened together.

A rear suspension assembly, about which an endless drive track is driven by the engine or motor, is typically attached to the opposing side panels such that the tunnel is positioned over the rear suspension assembly and covers an upper portion of the endless drive track. A straddle seat is positioned atop the tunnel and a pair of footrests are mounted to and extend laterally outwardly from the opposing side panels on either side of the straddle seat which, together with the seat, position and support a rider. In the case of gas-powered snowmobiles, a fuel tank is often mounted on the upper surface of the tunnel and is positioned, at least partially, between the straddle seat and the tunnel.

Electric snowmobiles employ electric powertrains which, in addition to one or more electric motors (as mentioned above), include a battery pack and various auxiliary systems, such as heating and cooling systems (i.e. thermal systems), for example. In examples, the battery pack includes a battery pack housing enclosing a number of battery modules, with each battery module including a number of battery cells. In some examples, the battery pack housing may further include additional battery pack components such as monitoring and control devices, electrical contactors for electrically connecting the battery modules to the electric motor, and charging system components, for example. In some examples, the battery pack may be mounted atop the metal tunnel so as to be disposed, at least partially, between the straddle seat and tunnel.

For snowmobiles in general, but for electric snowmobiles in particular, efficiencies in size, weight, and energy consumption improve vehicle performance (e.g., range, responsiveness), while design durability and modularity improve vehicle reliability and cost. The present application discloses utilizing a battery pack and, in particular, a housing of a battery pack, to improve the performance, durability, and modularity, as well as safety aspects, of an electric snowmobile. As will be described in greater detail below, according to one example, the present application discloses incorporating a battery pack housing as part of a chassis of an electric snowmobile, in particular, to form at least a portion of a tunnel structure. In one example, by employing a battery pack housing to form at least an upper surface of the tunnel structure, the upper panel employed by a conventional metal tunnel structure is eliminated, thereby lightening the snowmobile while maintaining a structural integrity of the chassis.

In other examples, the present application discloses incorporating a heat exchanger as part of a bottom surface of such battery pack, disposing the electric drive motor and/or controllers into the battery pack enclosure to improve modularity and durability of an electric snowmobile as well as to reduce manufacturing costs. In another example, the present application discloses sealing the battery housing to protect components and systems disposed therein from contaminants and to provide buoyancy to enable the snowmobile to float (for at least some amount of time) in emergency situations (e.g., an ice break through scenario). It is noted that such disclosed implementations may be employed separately or in various combinations with one another.

FIG. 1A is a block and schematic diagram generally illustrating an electric snowmobile 10 having a chassis 12 including a rear structure 14 and a front frame 16 where, according to one example of the present disclosure, as will be described in greater detail below, rear structure 14 is formed, at least in part, by a housing 20 of a battery pack 18. According to the present disclosure, the rear structure 14 is formed, at least in part, by the housing 20 of the battery pack 18 and replaces a conventional U-shaped metallic tunnel. In examples, housing 20 defines an enclosure 22 within which a number of rechargeable battery modules 24 and a battery management controller (BMC) 26 are enclosed. In one example, housing 20 has a lengthwise or longitudinal dimension extending in forward and rearward directions D1 and D2 of electric snowmobile 10. In one example, a pair of opposing flanges or side panels 28a and 28b extend downwardly from and along at least a portion of the length of battery housing 20 (note that only right side panel 28a is visible in FIG. 1A), such that a bottom surface 30 of battery housing 20 together with opposing side panels 28a and 28b form rear structure 14 of chassis 12. In one example, an additional front panel 32 may extend downwardly from a front portion of battery housing 20, where front panel 32 extends generally perpendicularly between opposing side panels 28a and 28b to close off and form a front wall 34 of rear structure 14. In other examples, housing 20 may be configured such that bottom surface 30 also forms front wall 34 (e.g., see FIGS. 7A-8 below).

Figure 1B:
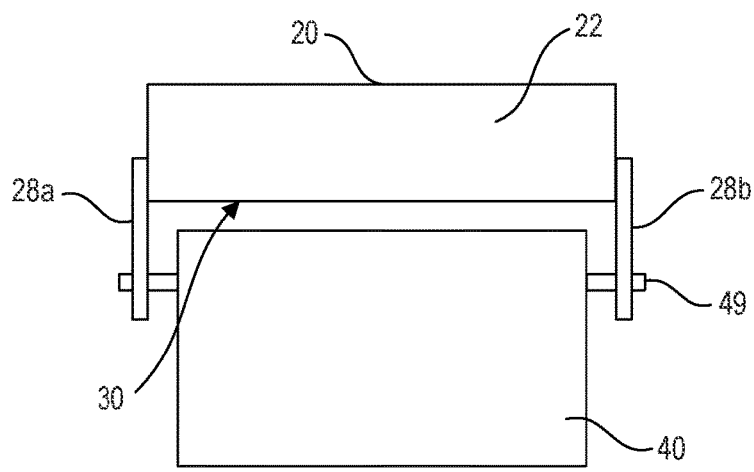
FIG. 1B is a cross-sectional view generally illustrating a tunnel structure formed in part by portions of a battery pack, in accordance with one example of the present disclosure.

With additional reference to FIG. 1B, which is a simplified cross-sectional view illustrating portions of electric snowmobile 10, according to one example, bottom surface 30 of housing 20 and opposing side panels 28a and 28b provide rear structure 14 with a generally inverted U-shaped structure. A rear suspension assembly 38 (see FIG. 1A), about which an endless drive track 40 is driven for propulsion of electric snowmobile 10, is mounted to rear structure 14, such as to opposing side panels 28a and 28b. In examples, rear suspension assembly 38 includes a pair of slide rails 42 which generally position and guide endless drive track 40 along with idler wheels, such as idler wheel 44. In examples, rear suspension assembly 38 further includes suspension arms 46 and 48 to connect to rear structure 14, such as via a mounting shaft 49, along with one or more shock absorbers and coil springs, such as shock absorber and coil spring 50 and 52. In examples, rear suspension assembly 38 is attached to opposing side panels 28a and 28b such that at least an upper portion of endless drive track 40 is positioned within rear structure 14.

It is noted that the block and schematic diagrams of FIGS. 1A and 1B are for illustrative purposes, and that battery housing 20, opposing side panels 28a and 28b, and front panel 28 may have different shapes and configurations than that illustrated. For example, while opposing side panels 28a and 28b are illustrated as extending beyond battery housing 20 in rearward direction D2, in other configurations, opposing side panels 28a and 28b may not extend beyond battery housing 20. In examples, opposing side panels 28a, 28b and front panel 32 may be attached to battery housing 20 via fasteners, such as bolts, for example. In some examples, opposing side panels 28a, 28b and front panel 32 may be formed of the same material as battery housing 20. In some examples, opposing side panels 28a, 28b and front panel 32 may be integrated as part of battery housing 20 (e.g., via welding). In other examples, opposing side panels 28a, 28b and/or front panel 32 may be integrally formed with bottom surface 30 of battery housing 20.

In examples, front frame 16 is connected to a forward portion of rear structure 14, such as to a forward portion of battery housing 20 (see also FIG. 1C), for instance, and extends in forward direction D1. A pair of front skis 54 are attached to front frame 16 via a front suspension assembly 55. A steering assembly 56, including a handlebar 58 connected to a steering column 59 is coupled to and provides directional control to front skis 54 to steer snowmobile 10.

In examples, an electric motor 60 and a corresponding electrical inverter 62 are mounted to front frame 16, where electrical inverter 62 converts DC power received from battery pack 30 via high-voltage power cables 64 to AC power to drive electric motor 60. In examples, front frame 16 includes a mid-bay or bulkhead structure to support electric motor 60 and electric inverter 62. In examples, rechargeable battery modules 24 include a number of battery cells which are interconnected in parallel and series combinations to provide a high voltage (HV) output, such as in the range of 300-400 VDC, and in some cases 800 VDC, for example. In some embodiments, the battery modules 24 may include a lithium ion or other suitable battery cell types. In examples, BMC 26 monitors and regulates a number of operating parameters of battery pack 18, such as voltage level and temperature levels of battery modules 24 and individual battery cells thereof, for example.

In examples, a straddle seat 68 is positioned atop and mounted to battery housing 20 and extends along a portion of the length thereof. In examples, a pair of footrests (sometimes called "running boards") 29a and 29b respectively extend outwardly from side panels 28a and 28b on either side of straddle seat 68 (only footrest 29a is visible in FIG. 1). Straddle seat 68 and footrests 29a and 29b are arranged to accommodate and position a rider on snowmobile 10. Footrests 29a and 29b also provide a rigid platform on which the rider may stand, if desired, when maneuvering. In one example, footrests 29a and 29b and corresponding side panels 28a and 28b from which they extend are formed of a contiguous piece of material (e.g., aluminum). In another example, footrests 29a and 29b are separate from and fastened to (e.g., bolted) corresponding side walls 28a and 28b.

By employing battery pack 18 to form a portion of rear structure 14 of chassis 12, rather than providing battery pack 18 separately from and in addition to a conventional tunnel, a weight of electric snowmobile 10 is reduced, thereby improving vehicle performance. Additionally, employing battery pack 18 as part of chassis 12 simplifies the structure of chassis 12 which, in-turn, simplifies assembly, reduces the bill of material and may lessen the costs of electric snowmobile 10.

In some embodiments, the snowmobile 10 includes elements of a snow vehicle described in International Patent Application no. WO 2019/049109 A1 entitled "Battery Arrangement for Electric Snow Vehicles", and U.S. Patent Application No. 63/135,497 entitled "Electric Vehicle With Battery Pack as a Structural Element", the entirety of which are incorporated herein by reference.

Figure 1C:
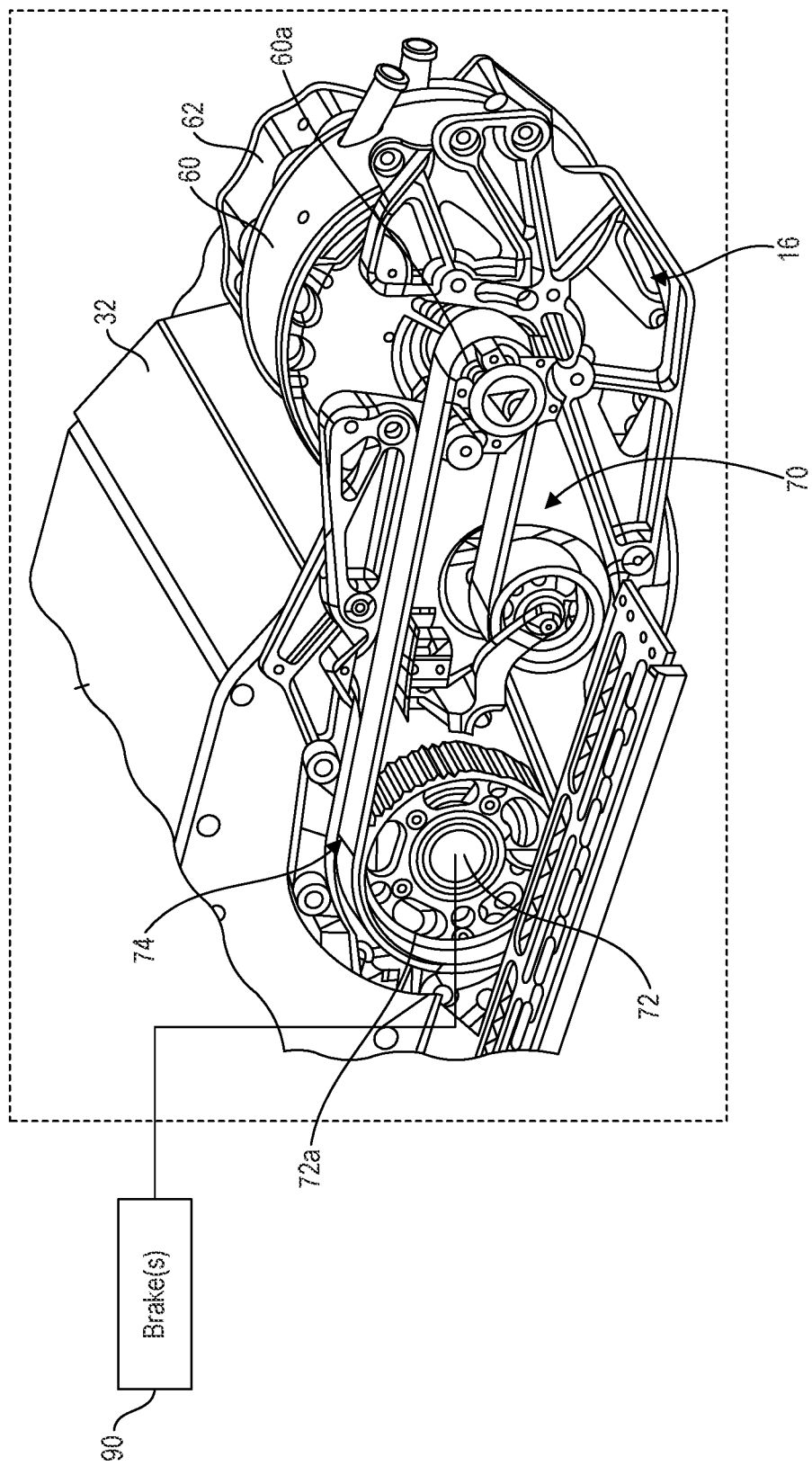
FIG. 1C is a perspective view illustrating an example of a motor and braking system of the electric snowmobile of FIG. 1A.

With reference to FIG. 1C, in examples, motor 60 is drivingly coupled to drive track 40 via a transmission 70 and a drive shaft 72 (e.g., included as part of rear suspension assembly 38). In examples, electric motor 60 is in a torque-transmitting arrangement with drive shaft 72 via transmission 70. In examples, transmission 70 may be of a belt/pulley type, a chain/sprocket type, a shaft/gear type, or other suitable type of transmission for transferring torque from electric motor 60 to drive shaft 72. In the illustrated example, transmission 70 includes a drive belt 74 that is mounted about an output 60a (e.g., a toothed drive wheel) of electric motor 60 and about a drive wheel 72a (e.g., a toothed drive wheel) for driving drive shaft 72. In some examples, drive belt 74 may be a chain belt. Drive belt 74 couples the motor output 60a with drive wheel 72a to convey torque from electric motor 60 to drive shaft 72 which, in-turn, drives endless drive track 40 to propel electric snowmobile 10.

In examples, electric motor 60 has a power output of between 120 and 180 horsepower. In other examples, electric motor 60 has a maximum output power of greater than 180 horsepower. In examples, the operation of electric motor 60 and the delivery of drive current to electric motor 60 from battery pack 18 and inverter 62 is controlled by a controller

80. In examples, controller 80 controls the delivery of drive current to electric motor 30 based on actuation of one or more input devices 82 (e.g., a throttle) by an operator. Controller 80 and input device(s) 82 are part of a control system CS for controlling operation of electric snowmobile 10.

In examples, at least one input device 82 is operatively connected to controller 80. Controller 80 is operable for controlling the inverter 62 to modulate an electrical output transmitted from battery pack 18 to the electric motor 60 as a function of a signal received from the input device 82, among other inputs. In examples, controller 80 is operable for controlling the torque, rotational speed and/or acceleration of the electric motor 60 and, thus, a thrust of endless drive track 40. Input device 82 may be located on handlebar 58 or at other suitable location(s), such as on foot rest 28a of the snowmobile 10. A direction of rotation of motor output 60a of electric motor 60 may be selected with the input device 82, or a separate input device (not shown) in order to propel the snowmobile 10 in a selected one of a forward direction D1 and a rearward direction D2.

Electric motor 60 has a forward configuration in which motor output 60a rotates in a first direction, R1, to propel the snowmobile 10 in forward direction D1, and has a rearward configuration in which the motor output 60a rotates in a second direction, R2 opposite the first direction R1 to propel snowmobile 10 in rearward direction D2. In examples, input device 82 is engageable to operate electric motor 30 in a selected one of the forward and rearward configurations to respectively propel snowmobile 10 in the forward and rearward directions D1, D2 with the electric motor 60. In examples, controller 80 is operable to invert a polarity of a current supplied from battery pack 18 to electric motor 60 to change a direction of rotation of motor output 60a of electric motor 60.

With reference to FIG. 1C, the snowmobile 10 may also include one or more brake(s) 90 that may be applied or released by an actuation of a brake actuator 92 (e.g., lever) by the operator for example. Brake 90 may be operable as a main brake for the purpose of slowing and stopping motion of the snowmobile 10. Brake 90 may include a combination of tractive braking and regenerative braking. In some examples, the brake 90 may be operable as described in U.S. patent application Ser. No. 17/091,712 entitled "Braking System for an Off-Road Vehicle", the entirety of which is incorporated herein by reference. Alternatively, or in addition, brake 90 may be operable as a parking brake, sometimes called "e-brake" or "emergency brake", of snowmobile 10 intended to be used when the snowmobile 10 is stationary. In some examples, such main and parking brake functions may use separate brakes, or may use a common brake 90.

Figure 2:
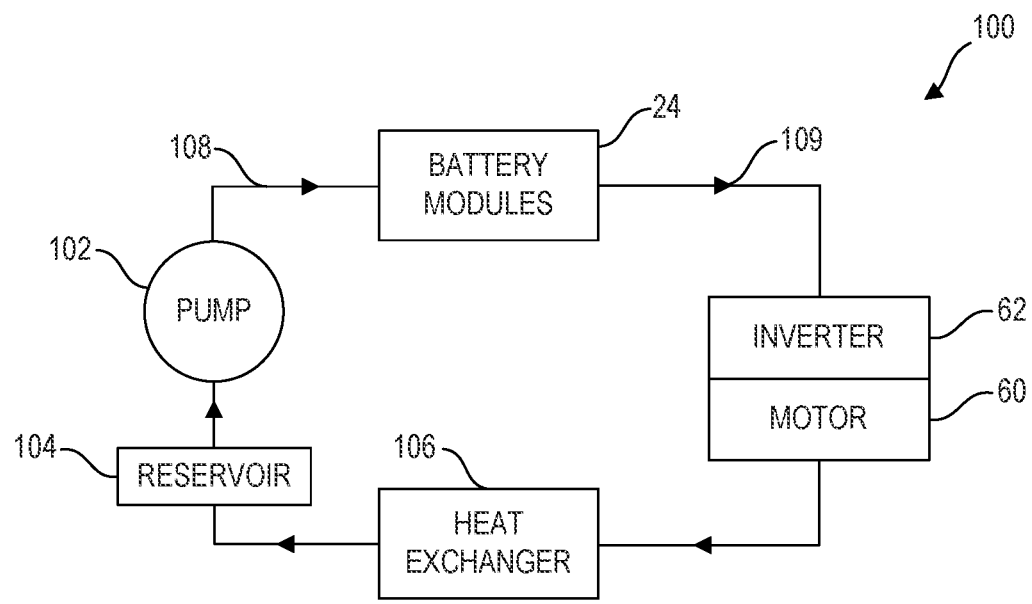
FIG. 2 is a block and schematic diagram generally illustrating a thermal management system of an electric snowmobile, according to one example of the present disclosure.

With reference to FIG. 2, according to one example, electric snowmobile 10 includes a thermal system 100 for maintaining temperatures of various components, such as battery modules 24, motor 60, and inverter 62, for instance, within desired temperature ranges. In one example, as illustrated by the block and schematic diagram of FIG. 2, thermal system 100 includes a pump 102, a fluid reservoir 104, a heat exchanger 106 (e.g. liquid-to-air), and a number of fluid circulation paths 108 (e.g., pipes, hoses, etc.). In one example, pump 102 circulates a thermal transfer fluid (e.g., glycol), as indicated by arrows 109, from fluid reservoir 104 through battery modules 24, inverter 62, and motor 60 and returns the thermal transfer fluid 110 to fluid reservoir 104 through heat exchanger 106 via fluid circulation paths 108, wherein heat exchanger 106 removes accumulated heat from thermal transfer fluid 109. Optionally, thermal system 100 may include a heater to warm battery modules 24 to an efficient temperature regime when battery pack 18 is left in cold temperatures for extended periods of time. In some embodiments, the configuration and operation of the thermal system 100 may be similar to that described in International Patent Application no. WO 2021/087620 A1 entitled "Thermal management system for electric vehicle".

Figure 3:
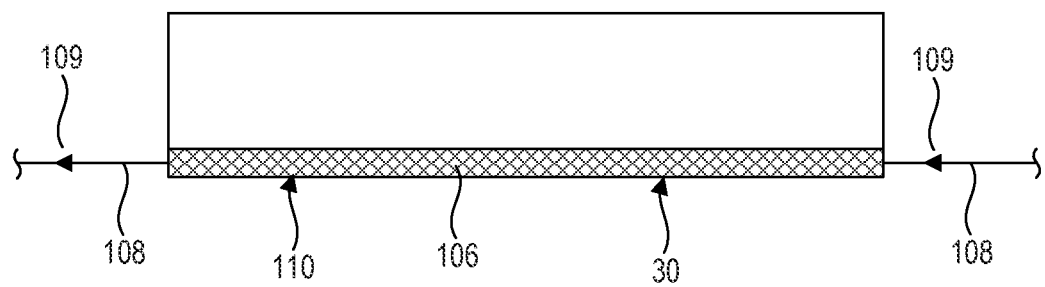
FIG. 3 is cross-sectional view generally illustrating a battery pack including a heat exchanger, in accordance with one example of the present disclosure.

FIG. 3 generally illustrates a longitudinal cross-sectional view of portions of battery housing 20, according to one example, where heat exchanger 106 is incorporated as part of a bottom panel 110 of housing 20, with bottom surface 30 of housing 20 being an exterior surface of bottom panel 110. As will be described in greater detail below (e.g., see FIGS. 4-5B), heat exchanger 106 includes a number of channels through which thermal transfer fluid 109 is circulated, with thermal energy being transferred from thermal transfer fluid 109 to the outside environment via bottom surface 30 (which is in contact with air as well as snow thrown there against by track 40). In examples, as described below, in addition to providing cooling of thermal transfer fluid 109, heat exchanger 106 is constructed in a fashion so as to structurally withstand high forces applied to chassis 12 during operation of electric snowmobile 10 which, in-turn, structurally strengthens battery housing 20 and rear structure 14.

In one example, as illustrated by FIG. 3, heat exchanger 106 receives and provides thermal transfer fluid 109 via fluid transfer paths 108 disposed external to enclosure 22 of housing 20, such that one or more components of thermal system 100 (e.g., pump 102, reservoir 104, and components serving motor 60 and inverter 62) are disposed external to housing 20. In other examples, such as illustrated by FIG. 6 below, thermal system 100 is disposed within housing 20, along with other components of electric snowmobile 10, such as motor 60 and inverter 62.

Figure 4:
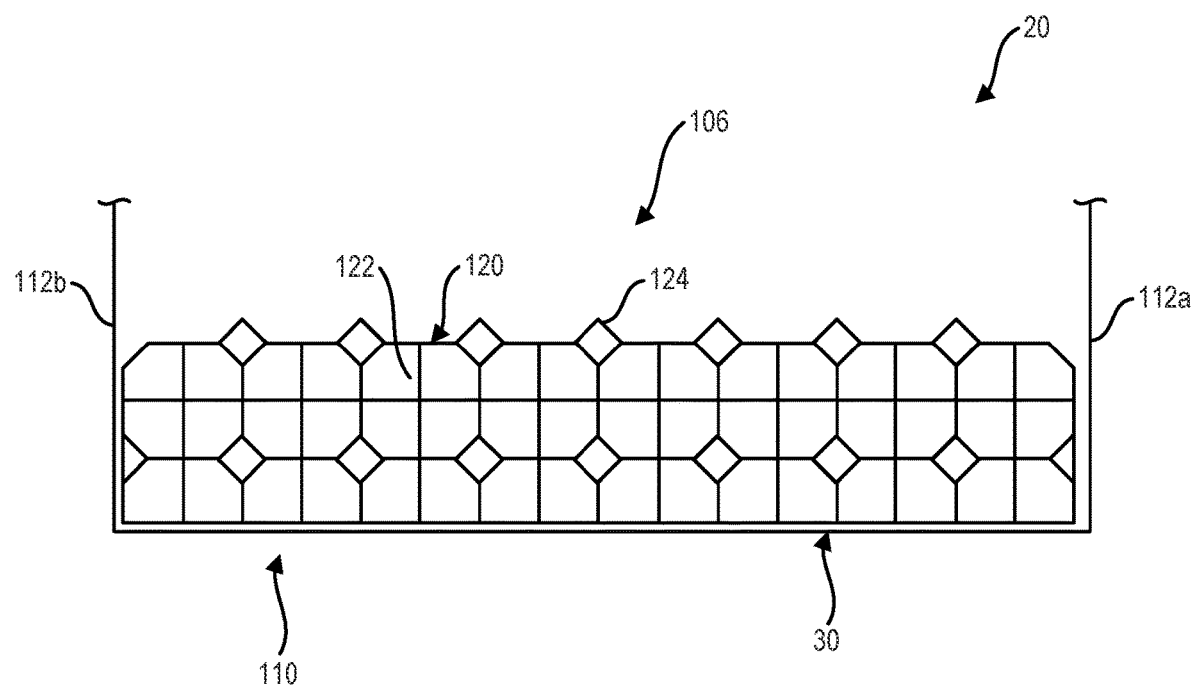
FIG. 4 is a cross-sectional view generally illustrating portions of a battery pack housing including a heat exchanger, according to one example of the present disclosure.

FIG. 4 generally illustrates a lateral cross-sectional view of portions of battery housing 20, according to one example, where heat exchanger 106 is incorporated as part of a bottom panel 110 of housing 20, with bottom surface 30 of housing 20 being an exterior surface of bottom panel 110. In one example, bottom panel 110 laterally extends between opposing side panels 112a and 112b of battery housing 20. As illustrated, according to one example, heat exchanger 106 includes a plurality of mechanically interconnected tubes 120 which are mechanically connected to at least bottom panel 110, and which define channels 122 through which thermal transfer fluid 109 is circulated. In other examples, heat exchanger 106 may be mechanically connected to bottom panel 110 and side panels 112a and 112b of battery housing 20. In examples, heat exchanger 106 is laminated to bottom panel 110 of housing 20. Channels 122 may be fluidically interconnected to form a meandering fluidic pathway in bottom panel 110. During operation, thermal transfer fluid 109 circulates through channels 122, with the interconnected sidewalls of tubes 120 serving as heat sinks to absorb and transfer heat from thermal transfer fluid 109 to exterior surface 30 of bottom panel 110.

In one example, as illustrated, tubes 120 are hexagonal in shape with horizontal and vertical (relative to bottom panel 110) sidewalls of tubes 120 being shared with laterally and vertically adjacent tubes 120 to form a single, interconnected structure. In one example, a plurality of square/diamond-shaped interconnect structures 124 interconnect "corner" portions of lateral and vertically adjacent hexagonal tubes 120, which may improve the structural rigidity of bottom panel 110. In examples, heat exchanger 106 is formed from aluminum. In one example, heat exchanger is formed from cast aluminum. In one example, heat exchanger 106 is an aluminum extrusion. Although illustrated and described primarily as comprising aluminum and being hexagonal in shape, it is noted that other suitable materials and shapes may be employed for tubes 120. Additionally, any number of suitable dimensions may be employed for tubes 120 (e.g., cross-sectional area).

Figure 5A:
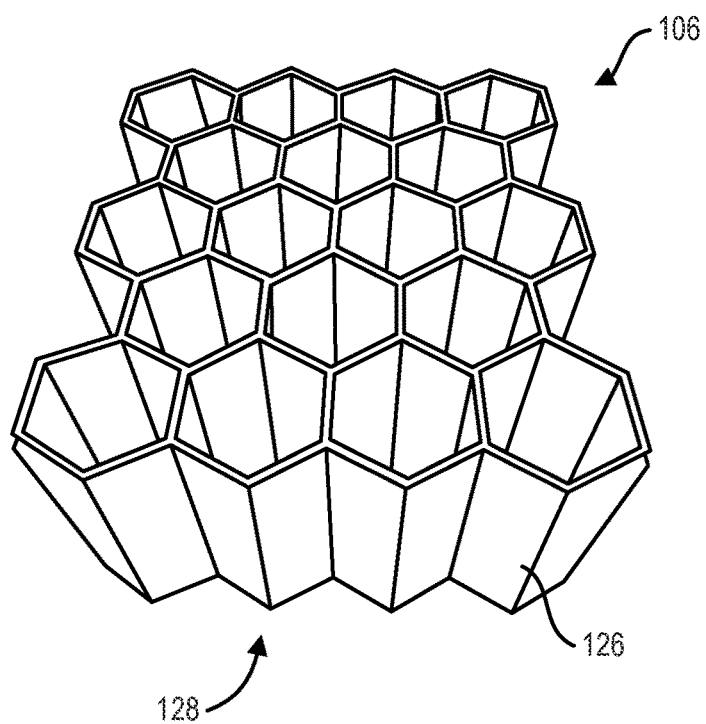
FIGS. 5A and 5B are perspective views of a heat exchanger structures for forming a portion of a battery pack housing, according to examples of the present disclosure.
Figure 5B:
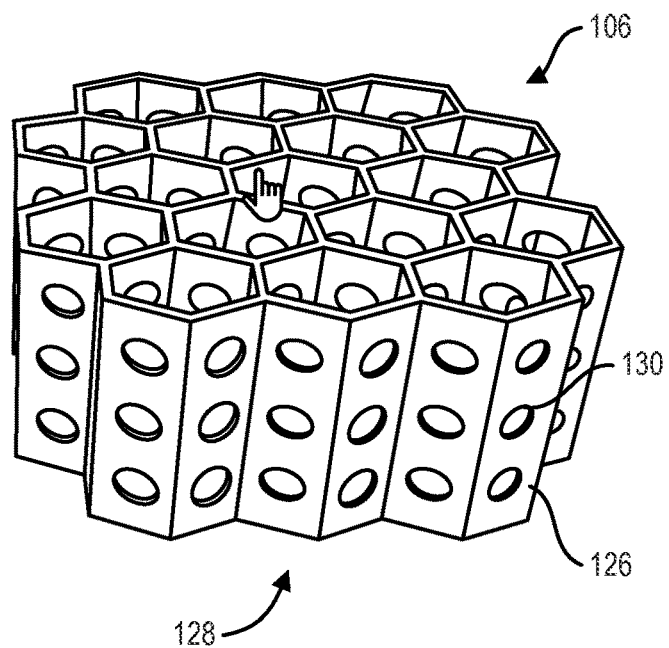

FIGS. 5A and 5B are perspective views generally illustrating portions of example structures for heat exchanger 106. With reference to FIG. 5A, heat exchanger 106 comprises a plurality of hexagonal tubes 126 interconnected along their lengths to form a single, monolithic honeycomb structure 128. FIG. 5B is similar to honeycomb structure 128 of FIG. 5B, except that sidewalls of hexagonal tubes 126 include a plurality of perforations 130 extending there through which enable the passage of thermal transfer fluid 109 between adjacent tubes 126 and which reduces a weight of heat exchanger 106 without comprising its structural integrity.

Figure 6A:
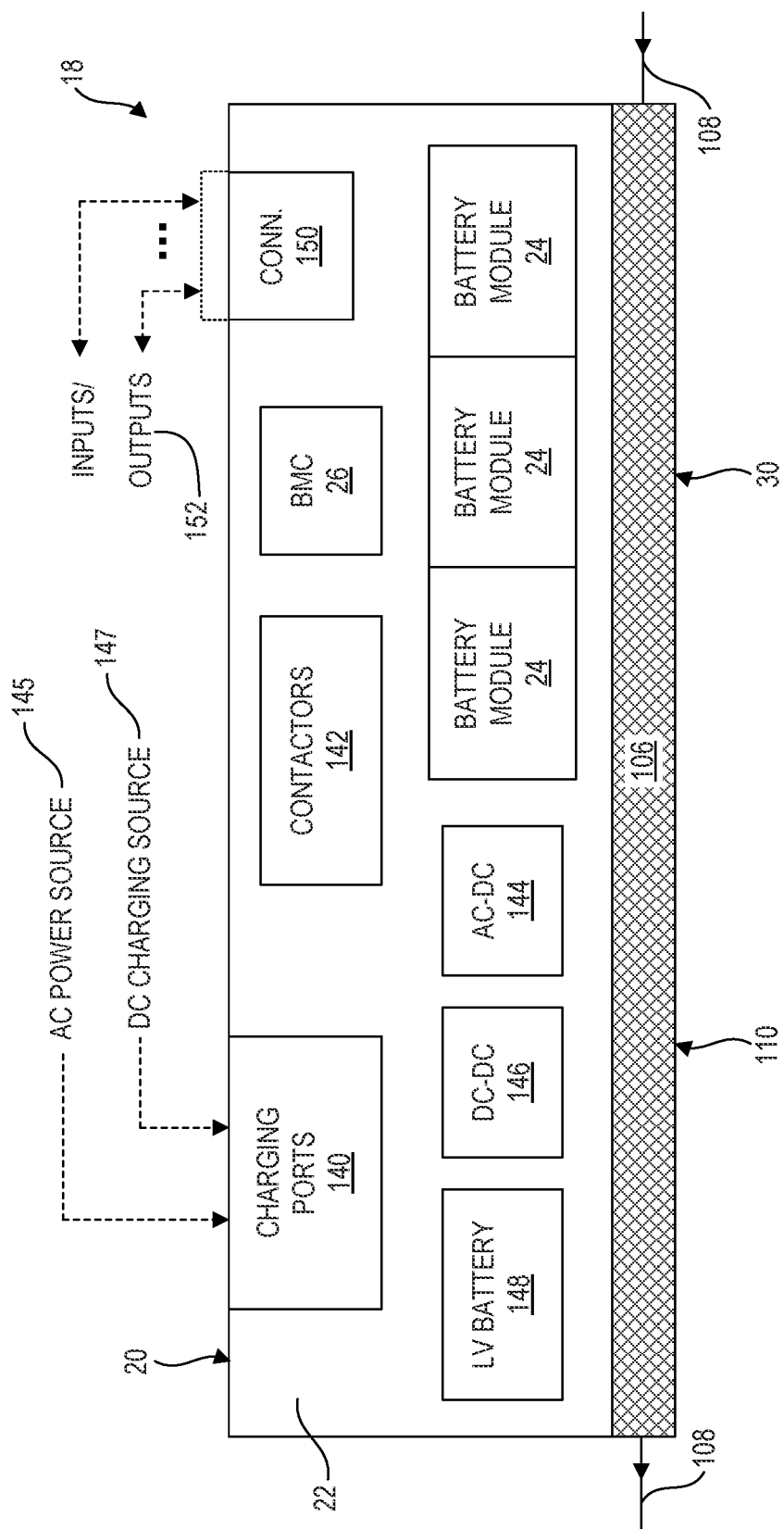
FIGS. 6A and 6B are block and schematic diagrams generally illustrating a battery pack housing enclosing electric powertrain components, according to examples of the present disclosure.

FIG. 6A is a block and schematic diagram generally illustrating battery pack 18, according to one example of the present disclosure. As illustrated, in one example, in addition to enclosing rechargeable battery modules 24 and BMC 26, and in addition to incorporating heat exchanger 106, housing 20 further encloses charging ports 140 which enable battery pack 18 to be connected to an AC power source 145 and/or a DC charging source 147 external to electric snowmobile 10. In one example, housing 20 further encloses a plurality of electrical contactors 142, an AC-DC charger 144, and a DC-DC converter 146 connectable to battery modules 24 to charge a low-voltage battery 148 (e.g., 12 V). In examples, the plurality of electrical contactors 142 are controllable (e.g., via controller 80) to connect battery modules 24 to inverter 62 to power electric motor 60, to connect external AC power source 145 to AC-DC charger 144 to charge battery modules 24, and to connect the external DC power source 147 to battery modules 24 for DC fast charging. In one example, battery pack housing 20 encloses a plurality of input/output (I/O) connectors 150 to enable connection to electrical inputs and outputs 152 for connecting to controller 80, for example.

Figure 6B:
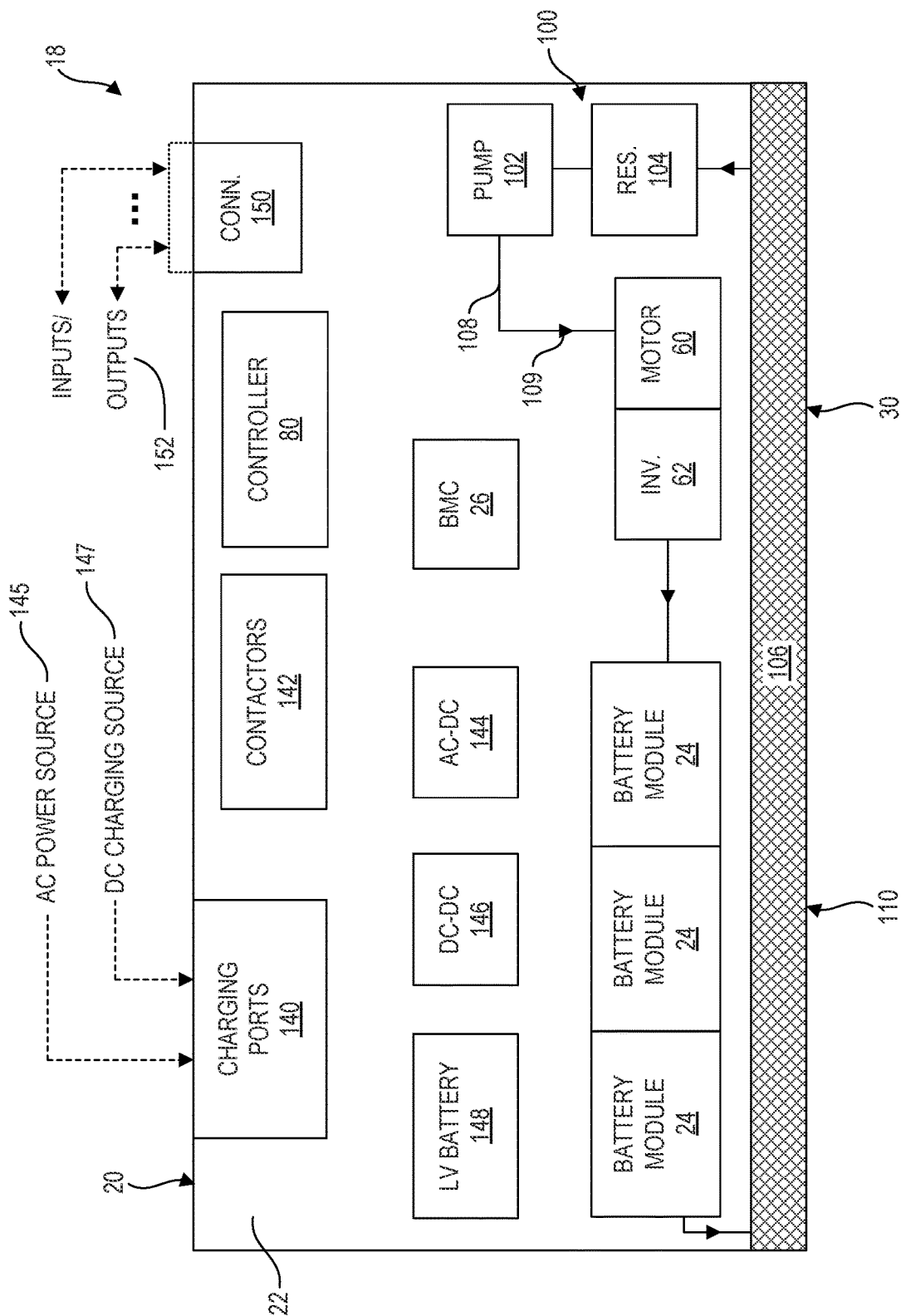

FIG. 6B is a block and schematic diagram generally illustrating battery pack 18, according to another example of the present disclosure. In the example of FIG. 6B, the battery pack 18 does not just provide a housing 20 for the battery modules 24, but for the entire electric powertrain. As shown in FIG. 6B, battery pack 18 provides a housing 20 defining a sealed enclosure for the electric powertrain, including at least the electric motor 60 having an electric inverter 62, a number of rechargeable battery modules 24 and a thermal management system 100. More specifically, the example implementation of FIG. 6B is similar to that of FIG. 6A, except that housing 20 further encloses motor 60 and corresponding inverter 62, as well as components of thermal system 100 which, in addition to heat exchanger 106, includes pump 102, reservoir 106, and fluid circulation paths 108 (and, in some examples, a number of fluid control valves and/or a heater (not illustrated)) to circulate thermal transfer fluid 109 through inverter 62, motor 60, battery modules 24, and heat exchanger 106.

In one example, housing 20 further encloses controller 80 (see FIG. 1A). In examples, the plurality of electrical contactors 142 are controllable (e.g., via controller 80) to connect battery modules 24 to inverter 62 to power electric motor 60, to connect the external AC power source 145 to AC-DC charger 144 to charge battery modules 24, and to connect the external DC power source 147 to battery modules 24 for DC fast charging. In one example, the plurality of input/output (I/O) connectors 150 enable connection to electrical inputs and outputs 152 external to housing 20, such as throttle 82 and any number of sensors, for example. It is noted that the example implementation of FIG. 6B is for illustrative purposes, and that additional or fewer components of electrical snowmobile 10 may be disposed within enclosure 22 formed by battery pack housing 20. In the example of FIG. 6B, battery pack housing 20 essentially serves as an electric powertrain enclosure where, as described above, an electric powertrain typically includes a battery system, one or more electric motors, and various auxiliary systems (e.g., heating/cooling systems).

Mounting various components of electric snowmobile 10 within enclosure 22 formed by battery housing 20 and providing ports and connector for connection to external components (e.g., charging ports 140 and input/output connectors 150) improves the modularity of electric snowmobile 10. Such modularity simplifies and improves assembly of snowmobile 10 and reduces costs. Additionally, housing 20 provides a protective enclosure to prevent potential physical damage to such components, including inter-component wiring, thereby improving the reliability/durability and reducing operating/maintenance costs of electric snowmobile 10. Furthermore, mounting high voltage components (e.g. 300-400 VDC, or 800 VDC) within housing 20, such as battery modules 24, motor/inverter 60/62, charging ports 140, electrical contactors 142, AC-DC charger 144, DC- and DC converter 146, for example, enables lengths of electrical conductors interconnecting such component to be reduced, thereby reducing electrical losses and improving vehicle performance (e.g., by extending battery life), and also prevents exposure to high voltage components.

In some examples, housing 20 is sealed to protect components therein from water and other contaminants (e.g., dirt and debris). In examples, housing 20 is formed by fastening together two or more components (e.g., panels). In some examples, one or more components forming housing 20 may be permanently affixed to one another, such as by welding. In some examples, one or more components forming housing 20 may be removably coupled to one another (e.g., via bolts or other suitable fasteners) with sealing mechanisms disposed there between (e.g., silicon-rubber O-rings, seals, and gaskets) to form a sealed connection. In examples, housing 20 is sealed so as to be watertight. In other examples, housing 20 is sealed so as to be water-resistant and prevent the infiltration of water for at least a desired time period when submerged therein (e.g., 20-30 minutes).

Figure 7A:
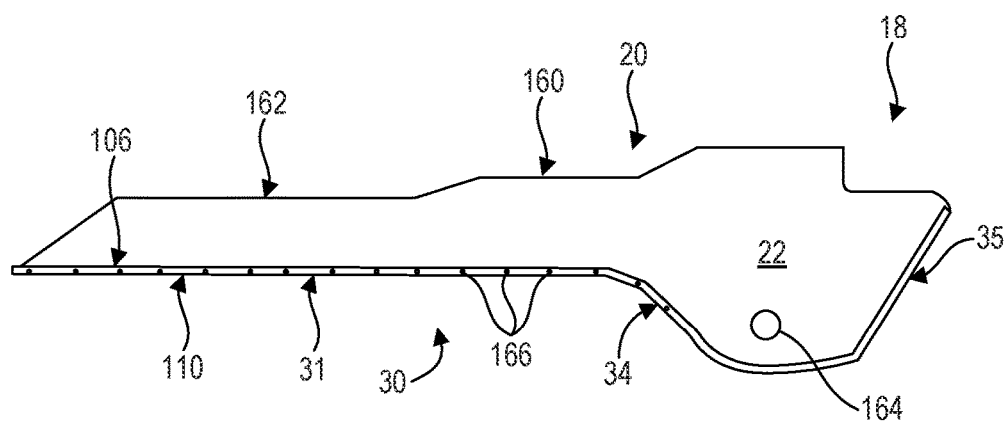
FIGS. 7A-7C are side views generally illustrating a battery pack housing and sidewall panels forming a tunnel structure for a chassis of an electric snowmobile, according to one example of the present disclosure.
Figure 7B:
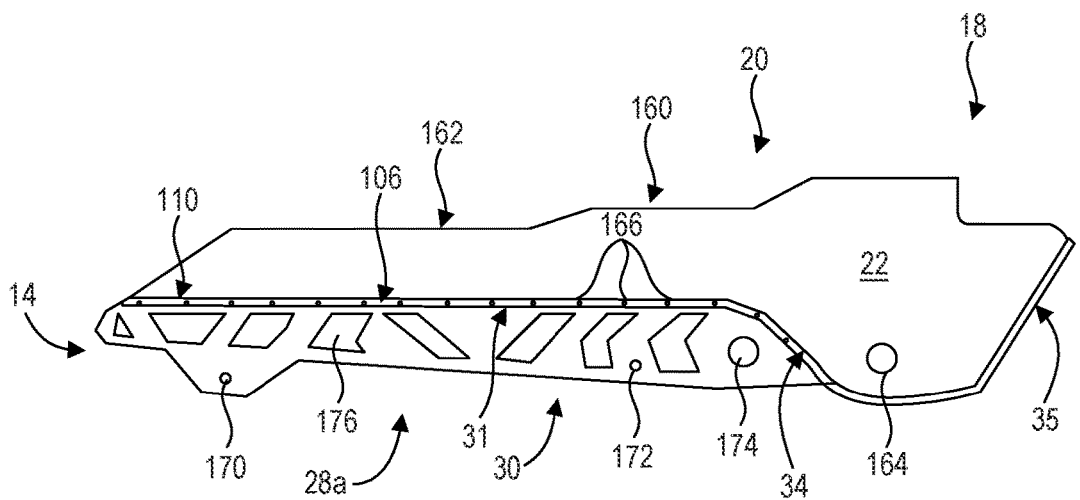
Figure 7C:
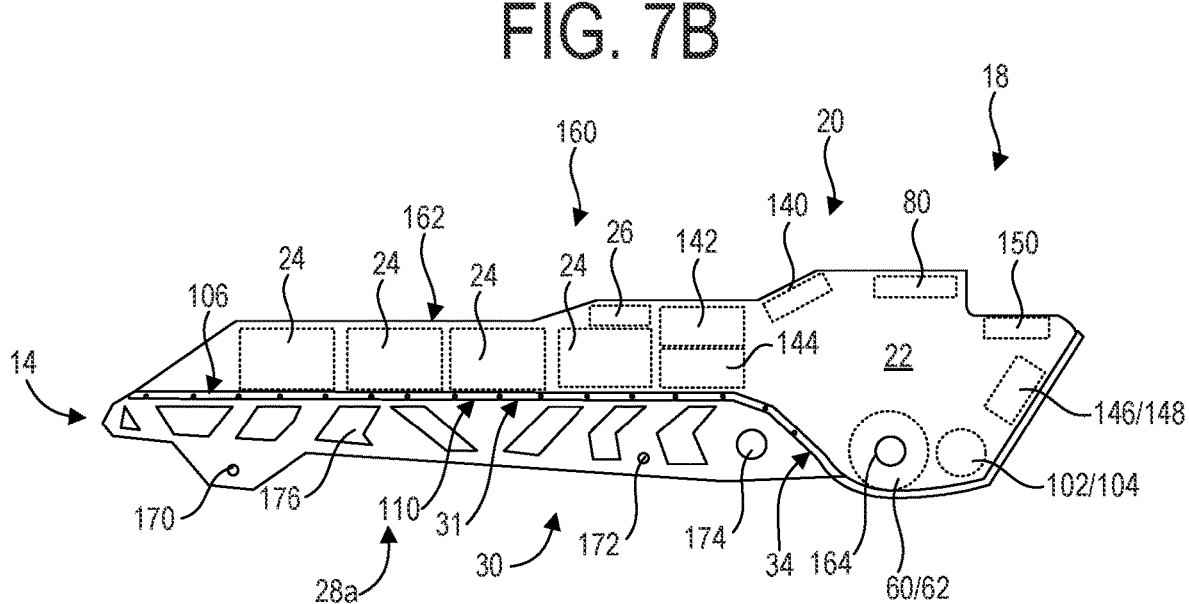
Figure 8:
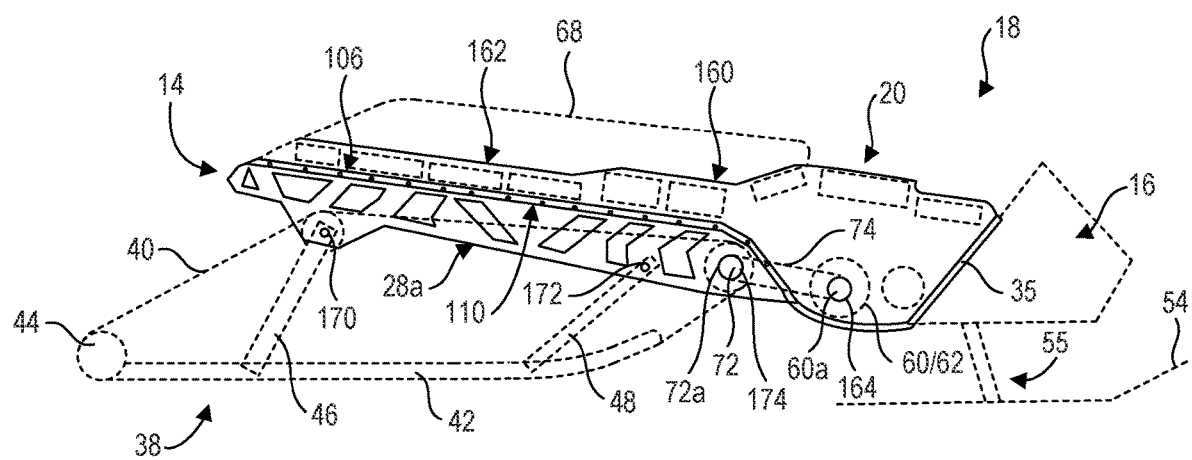
FIG. 8 is a block and schematic diagram generally illustrating portions of an electric snowmobile including a tunnel structure formed, at least in part, by a battery pack housing, in accordance with one example of the present disclosure.

FIGS. 7A-8 generally illustrate an example implementation of employing battery pack housing 20 of battery pack 18 and opposing side panels 26a, 26b to form a rear structure 14 of chassis 12 of electric snowmobile 10, in accordance with the present disclosure. FIG. 7A is a side view of battery pack housing 20, according to one example, where housing 20 includes a bottom panel 110 and an upper housing structure 160 which together define enclosure 22. In examples, upper housing structure 160 is configured as a removable lid which is sealably connected to bottom panel 110. In examples, upper housing structure 160 is bolted to bottom panel 110 (e.g., see bolt holes 166 in FIG. 7B). In examples, upper housing structure 160 may be formed using multiple components. In other examples, upper housing structure 160 may be formed of a single piece. In examples, components of battery pack housing 20, such as bottom panel 110 and upper housing structure 160, are formed of a same material. In examples, components of battery pack housing 20, including bottom panel 110 and/or upper housing structure 160, are formed of aluminum, but other suitable materials may be employed (e.g., fiber composites such as carbon fiber or fiberglass). Materials for battery pack housing 20 may be selected to be corrosion-resistant, lightweight and/or high strength.

In one example, bottom panel 110 (as illustrated by the "bold" lines) is shaped such that a first portion of bottom surface 30 defines a roof 31 of rear structure 14, and a second portion of bottom surface 30 defines front wall 34 of rear structure 14. In one example, a third portion of bottom surface 30 of bottom panel 110 defines a forward wall 35 which, as will be illustrated in greater detail below, provides support for connection to front frame 16 (see FIG. 8). The second portion and third portion of bottom surface 30 may define a mid-bay of snowmobile 10. In examples, bottom panel 110 may be formed of a single piece. In other examples, different portions of bottom panel 110, such as the first portion defining roof 31 and the second portion defining front wall 34, may be formed as separate piece and coupled together to form bottom panel 110.

In one example, bottom panel 110 incorporates heat exchanger 106, such as illustrated above by FIGS. 2-6. In one example, heat exchanger 106 extends along at least portions of bottom panel 110 forming roof 31 of rear structure 14. For example, heat exchanger 106 may extend along the length of the first portion of bottom surface 30 that defines the roof 31 of the U-shaped rear structure 14. Heat exchanger 106 may also or instead extend along the second portion of bottom surface 30 that defines front wall 34. Upper housing structure 160 defines an upper portion 162 of battery pack housing 20 and, in one example, as will be described in greater detail below, defines an aperture 164 through which a drive shaft of electric motor 60 disposed within enclosure 22 extends to the exterior (such as through a sealed bearing disposed within aperture 164).

As illustrated by FIG. 7B, according to one example, opposing side panels 28a and 28b (only right side panel 28a is visible) are connected to battery housing 20 to form rear structure 14. In one example, opposing side panels 28a, 28b are bolted to battery housing 20 via a plurality of bolt holes extending along a portion of a perimeter edge of bottom panel 110, such as illustrated at 166 (which point to only 3 of a plurality of bolt holes along the edge of bottom panel 110). Alternatively, bolt holes 166 may be formed in upper housing structure 160. It is noted that any number of other suitable fasteners may be employed to attach opposing side panels 28a, 28b to battery housing 20. In other examples (not illustrated), opposing side panels 28a, 28b may be formed integrally with battery pack housing 20.

In one example, opposing side panels 28a, 28b include apertures 170 and 172 for connecting to suspension arms 46 and 48 of rear suspension assembly 38, and an aperture 174 for connecting to drive shaft 72 for driving endless track 40. In one example, drive shaft 72 extends through opposing side panels 28a, 28b (such as through bearings disposed within apertures 174). In one example, a plurality of openings, such as opening 176, extend through opposing side panels 28a, 28b where, in addition to providing aesthetic value, reduce the weight of opposing side panels 28a, 28b. In some examples, opposing side panels 28a, 28b are formed of aluminum. In one example, opposing side panels 28a, 28b comprise cast aluminum. In other examples, opposing side panels 28a, 28b comprise extruded aluminum. It is noted that other suitable materials and formation processes may be employed.

With reference to FIG. 7C, according to one example, similar to that described above with respect to FIG. 6, battery pack 18 includes a number of components of electric snowmobile 10 disposed within enclosure 22 of battery pack housing 10. In one example, as illustrated by the dashed lines, housing 20 encloses a number of battery modules 24, BMC 26, motor/inverter 60/62, controller 80, pump/reservoir 102/104, charging ports 140, contactors 142, AC-DC charger 144, DC-DC converter/low-voltage battery 146/148, and input/output connectors 150. Housing 20 protects motor 60 and inverter 62 (as well as other components) from water, dust, dirt, and debris, and also provides protection against potential impacts. Additionally, housing 20 protects high voltage cabling (e.g., 300-400 VDC or up to 800 VDC) between battery modules 24 and motor/inverter 60/62 from damage and external exposure, and, depending on the configuration employed, may shorten the lengths of such high voltage cabling. Additionally, disposing motor/inverter 60/62 within housing 20 eliminates an external cradle structure, thereby simplifying the structure of front frame 16, with housing 20 representing the bulk of chassis 12.

FIG. 8 is a schematic diagram generally illustrating portions of electric snowmobile 10 employing housing 20 of battery pack 18 and opposing side panels 28a and 28b to form rear structure 14 of chassis 12, according to one example. Components of electric snowmobile 10 other than battery pack 18 and opposing side panel 28a are illustrated in dashed lines so as to highlight a position of battery pack 18 and opposing side panels 28a and 28b relative to other components of electric snowmobile 10.

In one example, rear suspension assembly 38 is attached to rear structure 14 by suspension arms 46 and 48 being respectively pivotally connected to opposing side panels 28a and 28b via apertures 170 and 172 therein. In one example, drive shaft 72 for drive track 40 extends through aperture 174 to drive wheel 72a (e.g., a toothed wheel as illustrated by FIG. 1C), and a shaft of electric motor 60 extends through aperture 164 to motor output 60a (e.g., a toothed wheel as illustrated by FIG. 1C). In one example, drive belt 74 extends about motor output 60a and drive wheel 72a to transfer torque from motor 60 to drive shaft 72 to drive endless track 40 about rear suspension assembly 38.

Safety is an important factor in snowmobile design. Because snowmobiles can be driven over frozen bodies of water (e.g., lakes), it is desirable to design a snowmobile that is buoyant in water, to avoid the snowmobile sinking in the case of ice break-through.

Figure 9A:
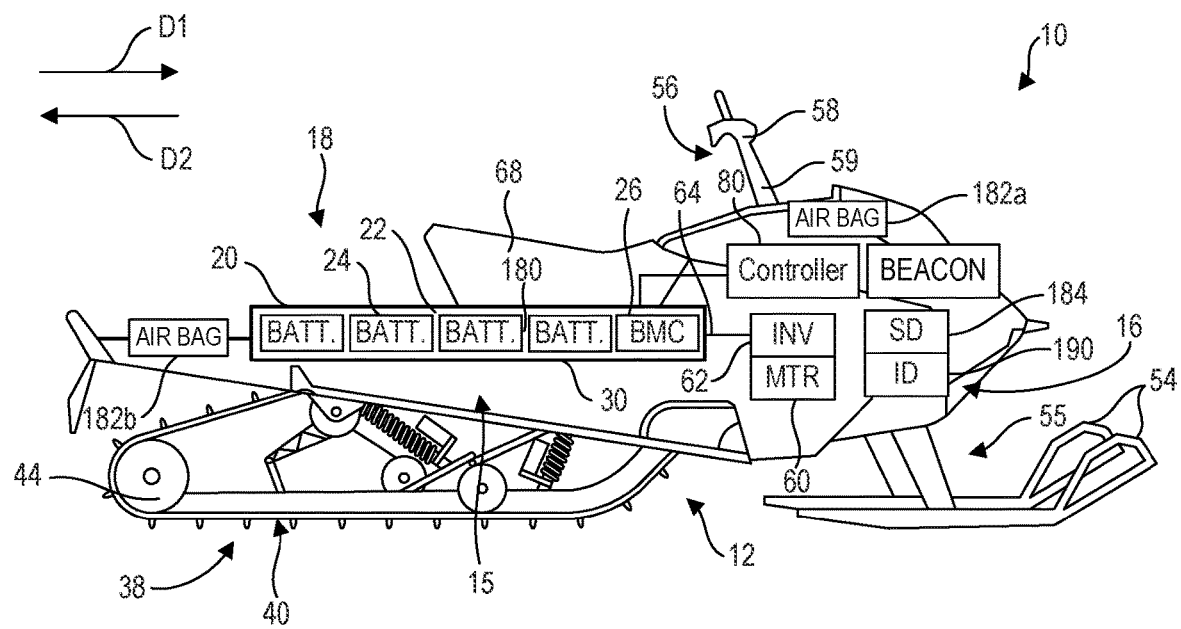
FIGS. 9A and 9B generally illustrate an electric snowmobile including a battery pack forming a sealed enclosure to provide buoyancy, in accordance with one example of the present disclosure.
Figure 9B:
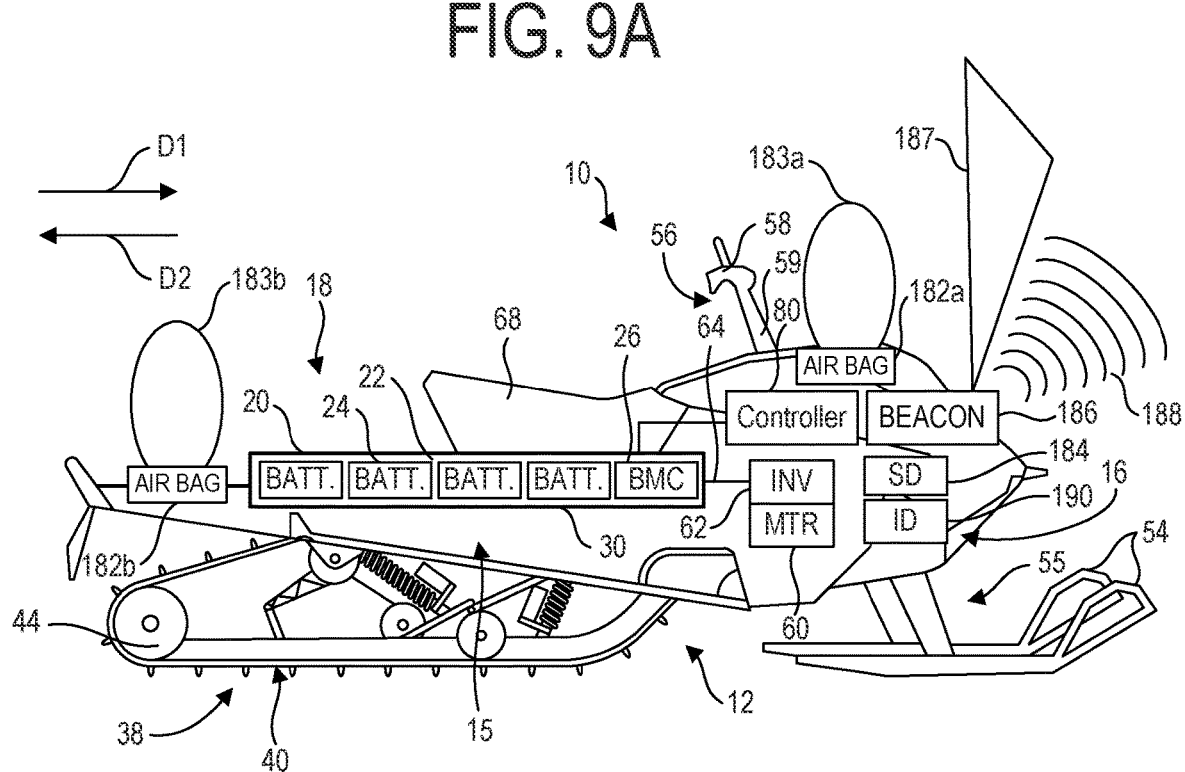

FIGS. 9A and 9B are block and schematic diagrams generally illustrating an electric snowmobile 10 having a battery pack 18 including a battery pack housing 20, according to one example of the present disclosure. It is noted that electric snowmobile 10 of FIGS. 9A and 9B is similar to that illustrated by FIGS. 1A & 1C with the same identifying numbers identifying the same features. However, in the example implementation of FIGS. 9A and 9B, it is noted that housing 20 of battery pack 18 is not employed to form a portion of a rear structure 14. Instead, rear structure 14, as illustrated in FIGS. 9A and 9B comprises a conventional tunnel 15 which is independent from housing 20. It is noted, however, that, in other examples, housing 20 may be employed to form a portion of rear structure 14 (such as illustrated by the implementation of FIGS. 1A and 1C) without impact to the performance of housing 20 with regard to the implementation of FIGS. 9A and 9B, as described below.

In accordance with the implementation of FIGS. 9A and 9B, housing 20 of battery pack 18 is sealed, such as described above with respect to FIG. 6, so as to be water tight. In addition to protecting components (such as battery modules 24 and BMC 26) disposed within sealed enclosure 22 formed by housing 20 from water and other contaminants, enclosure 22 contains a volume of air 180 sealed therein, where, in the case the snowmobile enters a body of water, the volume of air 180 provides sufficient buoyancy to maintain electric snowmobile 10 afloat for a certain duration (at least longer than the 10 minutes). At sea level, the buoyancy of 1 cubic meter of air is approximately 1,000 kilograms. In one example, sealed enclosure 22 of housing 20 is designed to contain between approximately 0.150 and 0.350 cubic meters of air and, thus, provides approximately 150-350 kilograms of buoyancy. In one example, an approximate weight of electric snowmobile 10 is between 250-300 kg, such that a sealed enclosure 22 of housing 20 having a volume of air of 0.25 to 0.3 cubic meters will keep the snowmobile afloat.

In one example, in addition to the so-called "passive" buoyancy provided by air volume 180 sealed within enclosure 22 of housing 20, electric snowmobile 10 includes "active" buoyancy provided by at least one air bag 182 which deploys upon electric snowmobile 10 entering a body of water. In one example, as illustrated, electric snowmobile 10 includes a front air bag 182a and a rear air bag 182b. In one example electric snowmobile 10 includes a submersion detector 184, which, upon becoming submerged in water causes one or both of air bags 182a and 182b to deploy, such as illustrated at 183a and 183b. Together, the buoyancy provided by battery pack 18 and deployed air bags 183a and 183b may keep electric snowmobile 10 afloat for a desired period of time. In other embodiments, the addition of air bags may allow the sealed enclosure 22 of housing 20 to seal a volume of air less than required to keep the snowmobile afloat.

In one example, electric snowmobile 10 includes a beacon 186. In one example, upon becoming submerged in water, submersion detector 184 triggers beacon 186 to emit a high visibility light beacon 187 and/or an audible beacon 188 to identify a location of snowmobile 10 to potential rescuers. In one example, beacon 186 may be manually activated in a scenario where a driver desires to make his or her location known to others. In another example, upon becoming submerged in water, submersion detector 184 triggers controller 80 to initiate a wireless transmission of a distress signal providing GPS coordinates of the location of electric snowmobile 10.

In examples, electric snowmobile 10 includes at least one impact detector 190 where, upon detection of an impact, impact detector causes one or both of air bags 182a and 182b to deploy. It is noted that the positions of submersion detector 184, air bags 182a and 182b, and impact detector 190 as shown in FIG. 8 are for illustrative purposes, and that such components may be placed in locations other than those shown. Additionally, it is noted that more or fewer than two air bags 182a and 182b may be employed. In some cases, deployment of a first portion of such air bags may be controlled by submersion detector, deployment of a second portion of such air bags may be controlled by impact detector 190, and deployment of another portion of such air bags may be controlled by both submersion detector 184 and impact detector 190.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A chassis for an electric snowmobile comprising:
 a battery pack including a battery pack housing defining an enclosure for housing a number of battery modules for powering an electric motor of the electric snowmobile, the battery pack housing having a length extending in a longitudinal direction of the snowmobile, the battery pack housing including a bottom surface; and
 a pair of opposing side panels extending downwardly from and along at least a portion of the length of the battery pack housing, the opposing panels and at least portions of the bottom surface of the battery pack housing together forming a rear structure extending in the longitudinal direction of the electric snowmobile, the opposing side panels forming sidewalls of the rear structure and the bottom surface forming at least a roof of the rear structure.

2. The chassis of claim 1, wherein the bottom surface forms a front wall of the rear structure.

3. The chassis of claim 1, wherein the pair of opposing side panels are attached to the battery pack housing.

4. The chassis of claim 1, wherein the pair of opposing side panels are integrally formed with the battery pack housing.

5. The chassis of claim 1, the opposing side panels to couple to a rear suspension assembly including a drive track of the snowmobile such that the rear structure is disposed over at least a portion of the drive track.

6. The chassis of claim 1, the battery pack housing having a forward portion and a rearward portion, the chassis including a front structure coupled to the forward portion of the battery enclosure.

7. The chassis of claim 6, the front structure to couple to a front suspension assembly of the snowmobile, the front suspension assembly including a pair of skis.

8. The chassis of claim 1, the battery pack housing including a bottom panel having an exterior surface defining the bottom surface of the battery pack housing, wherein the bottom panel includes a heat exchanger for cooling a heat transfer fluid used to cool at least the number of battery modules.

9. The chassis of claim 8, the enclosure housing the electric motor and a corresponding inverter, and a pump for circulating the heat transfer fluid.

10. The chassis of claim 1, the enclosure being sealed in a watertight fashion.

11. The chassis of claim 10, the sealed enclosure defining an enclosed air volume to provide buoyancy to the snowmobile to keep the snowmobile afloat.

12. The chassis of claim 1, the enclosure housing an AC-DC charger for charging the number of battery modules.

13. The chassis of claim 12, the enclosure housing a low voltage battery.

14. The chassis of claim 13, the enclosure housing a DC-DC converter to charge the low voltage battery from the number of battery modules.

15. The chassis of claim 12, the enclosure housing at least one of an AC charging port for receiving an external AC power source and a DC charging port for receiving an external DC charging source.

16. An electric snowmobile comprising:
 an electric motor; and
 a chassis comprising:
 a battery pack including a battery pack housing defining an enclosure for housing a number of battery modules for powering the electric motor of the electric snowmobile, the battery pack housing having a length extending in a longitudinal direction of the snowmobile, the battery pack housing including a bottom surface; and a pair of opposing side panels extending downwardly from and along at least a portion of the length of the battery pack housing, the opposing panels and at least portions of the bottom surface of the battery pack housing together forming a rear structure extending in the longitudinal direction of the electric snowmobile, the opposing side panels forming sidewalls of the rear structure and the bottom surface forming at least a roof of the rear structure.

17. The electric snowmobile of claim 16, wherein the pair of opposing side panels are attached to the battery pack housing.

18. The electric snowmobile of claim 16, wherein the pair of opposing side panels are integrally formed with the battery pack housing.

19. The electric snowmobile of claim 16, the enclosure of the battery pack being sealed in a watertight fashion.

20. The electric snowmobile of claim 19, the enclosure sealed in the watertight fashion defining an enclosed air volume to provide buoyancy to the snowmobile to keep the snowmobile afloat.

* * * * *